(12) United States Patent
Ahn

(10) Patent No.: US 7,672,584 B2
(45) Date of Patent: Mar. 2, 2010

(54) DIGITAL DEVICE

(75) Inventor: Kyoung-jin Ahn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 379 days.

(21) Appl. No.: 11/606,997

(22) Filed: Dec. 1, 2006

(65) Prior Publication Data

US 2007/0206943 A1 Sep. 6, 2007

(30) Foreign Application Priority Data

Mar. 6, 2006 (KR) .................... 10-2006-0021118
Sep. 20, 2006 (KR) .................... 10-2006-0091466

(51) Int. Cl.
*G03B 17/02* (2006.01)

(52) U.S. Cl. .................... 396/539; 348/372; 348/373; 396/535; 379/433.08

(58) Field of Classification Search ................ 396/535, 396/539; 348/372–373, 14.02; 455/575.4; 379/433.08
See application file for complete search history.

(56) References Cited

U.S. PATENT DOCUMENTS

| | | | | |
|---|---|---|---|---|
| 6,137,960 | A * | 10/2000 | Komatsuzaki et al. | 396/177 |
| 6,571,063 | B2 * | 5/2003 | McIntyre et al. | 396/287 |
| 2001/0017983 | A1 * | 8/2001 | Tanaka | 396/348 |
| 2004/0133716 | A1 * | 7/2004 | Lee | 710/72 |
| 2004/0204202 | A1 * | 10/2004 | Shimamura et al. | 455/575.1 |
| 2004/0257334 | A1 | 12/2004 | Yajima | |
| 2005/0047773 | A1 * | 3/2005 | Satake et al. | 396/301 |
| 2005/0049019 | A1 * | 3/2005 | Lee | 455/575.4 |
| 2005/0124398 | A1 * | 6/2005 | Lee et al. | 455/575.4 |
| 2005/0140649 | A1 * | 6/2005 | Shudo et al. | 345/158 |
| 2005/0140811 | A1 | 6/2005 | Yoo et al. | |
| 2006/0109754 | A1 * | 5/2006 | Iijima | 369/30.01 |
| 2006/0111146 | A1 * | 5/2006 | Kim | 455/557 |
| 2006/0234786 | A1 * | 10/2006 | Taniguchi et al. | 455/575.4 |
| 2006/0246955 | A1 * | 11/2006 | Nirhamo et al. | 455/566 |
| 2007/0097248 | A1 | 5/2007 | Yoo et al. | |
| 2007/0104477 | A1 * | 5/2007 | Misawa | 396/299 |
| 2007/0115382 | A1 * | 5/2007 | Fukuma et al. | 348/333.06 |
| 2007/0204431 | A1 * | 9/2007 | Scherling et al. | 16/69 |
| 2008/0311963 | A1 * | 12/2008 | Strawn | 455/575.1 |

FOREIGN PATENT DOCUMENTS

| | | |
|---|---|---|
| CN | 1627772 A | 6/2005 |
| CN | 1638403 | 7/2005 |
| EP | 1 551 157 A1 | 7/2005 |

(Continued)

*Primary Examiner*—W. B. Perkey
*Assistant Examiner*—Dennis Hancock
(74) *Attorney, Agent, or Firm*—Roylance, Abrams, Berdo & Goodman, L.L.P.

(57) ABSTRACT

A digital device which can accommodate a large display yet still have a small overall size is provided. The digital device includes a first body with a lens and a display, and a second body with at least one operation button. The first and second body slide with respect to each other between a first position and a second position. The lens of the first body and the at least one operation button of the second body are exposed as the first body and the second body are slid into the first position.

28 Claims, 8 Drawing Sheets

FOREIGN PATENT DOCUMENTS

| | | |
|---|---|---|
| EP | 1 613 026 | 1/2006 |
| JP | 11-064928 | 3/1999 |
| JP | 2004-297337 | 10/2004 |
| JP | 2005-130219 | 5/2005 |
| JP | 2005-136778 | 5/2005 |
| JP | 2005-260674 | 9/2005 |
| WO | WO 2004080039 A1 | 9/2004 |

* cited by examiner

DIGITAL DEVICE

CROSS-REFERENCE TO RELATED APPLICATIONS

This application claims the benefit under 35 U.S.C. § 119 (a) of Korean Patent Application Nos. 2006-21118 and 2006-91466, filed on Mar. 6, 2006 and Sep. 20, 2006, respectively, in the Korean Intellectual Property Office, the entire disclosures of which are hereby incorporated by reference.

BACKGROUND OF THE INVENTION

1. Field of the Invention

The present invention relates to a digital device which has various functions, including voice recording, MP3 playing, DMB receiving, web camera, still image capturing, and moving image capturing.

2. Description of the Related Art

Recently, digital devices equipped with various functions including voice recording, MP3 playing, web camera, still image capturing, and moving image capturing have been introduced to the consumer market. Products equipped with the capability to receive digital multimedia broadcasting (DMB) will also be introduced soon.

There are competing interests when designing a digital device that includes various functions. On the one hand, consumers prefer the digital devices to be small so that they are easy to carry. On the other hand, to display video, such as DMB video, the devices should have a large display. Furthermore, the digital devices should have a number of buttons to operate the various functions of the device.

When the display and the operation buttons are arranged on a single body, and the display is made large enough to satisfy consumer demands, the overall size of the digital device must be increased. Another design constraint is imposed by the addition of a gripping portion to allow a user to conveniently grip a digital device. The gripping portion may interfere with and restrict the size of the display.

Accordingly, there is a need for a digital device that has a large display for viewing video, such as DMB video, yet still has a small overall size. The digital device should also have a grip to so that a user may conveniently grasp and use the digital device.

SUMMARY OF THE INVENTION

An aspect of the present invention is to address at least the above problems and/or disadvantages and to provide at least the advantages described below. Accordingly, an aspect of the present invention is to provide a digital device which can be mounted with a large display despite of its overall size being not large, and is easy to grip and therefore convenient to use.

In accordance with an aspect of the present invention, a digital device comprises a first body with a display and a second body with at least one operation button. The second body slides between a first position and a second position. The at least one operation button of the second body is exposed as the first body and the second body are slid into the first position.

A lens may be disposed on the first body so that the lens is exposed as the first body and the second body are slid into the first position.

The lens of the first body and the at least one operation button of the second body may be hidden as the first body and the second body are slid into a second position.

An image capturing mode may be selected when the first body and the second body are slid into the first position.

At least one function button may be provided on a display mounting portion of the first body.

A speaker may be provided on a display mounting portion of the first body.

A pushing portion may be provided on the first body, and the pushing portion may include at least one protrusion for preventing slippage.

A gripping portion may be provided on the second body, and the gripping portion may comprise at least one gripping groove. The gripping groove may comprise a protrusion for preventing slippage.

A plurality of operation buttons may be provided. The plurality of operation buttons may include a zoom button, a 5-way button for operating a menu, a mode switch button, and a menu selection button. The mode switch button may be ring-shaped and arranged around the 5-way button.

The second body may comprise a microphone, a power button, and a shutter disposed on a top surface of the second body, an A/V and an earphone jack disposed on an upper side surface of the second body, and a power supply jack and a USB jack disposed on a lower side surface of the second body.

In accordance with another aspect of the present invention, a digital device includes a first body with a lens and a display, a second body with at least one operation button, and a sliding apparatus slidably connecting the first and second bodies.

The lens of the first body and the at least one operation button of the second body may be exposed by sliding the first body and the second body with respect to each other.

A guide roller for facilitating sliding may be provided.

The sliding apparatus may comprise a first sliding member combined with the first body and a second sliding member combined with the second body.

An image capturing mode may be selected when the first body and the second body are slid with respect to each other.

A pushing portion may be provided on the first body, and the pushing portion may include at least one protrusion for preventing slippage.

A gripping portion may be provided on the second body, and the gripping portion may include at least one gripping groove.

A plurality of operation buttons may be provided. The plurality of operation buttons may include a zoom button, a 5-way button for operating a menu, a mode switch button, and a menu selection button. The mode switch button may be ring-shaped and arranged around the 5-way button.

The second body may comprise a microphone, a power button, and a shutter disposed on a top surface of the second body, an A/V and an earphone jack disposed on an upper side surface of the second body, and a power supply jack and a USB jack disposed on a lower side surface of the second body.

In accordance with another aspect of the present invention, a digital device comprises a first body having a lens and a display and a second body having at least one operation button. The second body is slidably connected to the first body so that it can slide between a first and a second position. In the first position the lens and the at least one operation button are exposed, and in the second position the lens and the at least one operation button are hidden.

A sliding apparatus to slidably connect the first and second bodies so that the first and second bodies can slide between the first and second positions may be provided.

The sliding apparatus may comprise a first sliding member disposed on the first body and a second sliding member disposed on the second body. The second sliding member slides with respect to the first sliding member.

A plurality of guide rollers may be provided on the first and second sliding members for facilitating the sliding movement of the first and second bodies.

At least one biasing member may be provided between the first and second sliding members to facilitate sliding of the first and second sliding members.

The first and second sliding members may form a battery space for accommodating a battery.

BRIEF DESCRIPTION OF THE DRAWINGS

The above aspects and features of the present invention will be more apparent by describing certain exemplary embodiments of the present invention with reference to the accompanying drawings, in which.

Throughout the drawings, the same reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the exemplary embodiments of the invention and are merely exemplary. Accordingly, those of ordinary skill in the art will recognize that various changes and modifications of the exemplary embodiments described herein can be made without departing from the scope and spirit of the invention. Also, descriptions of well-known functions and constructions are omitted for clarity and conciseness.

Hereinafter, exemplary embodiments of the present invention will be described in detail with reference to the accompanying drawings.

Figure 1:
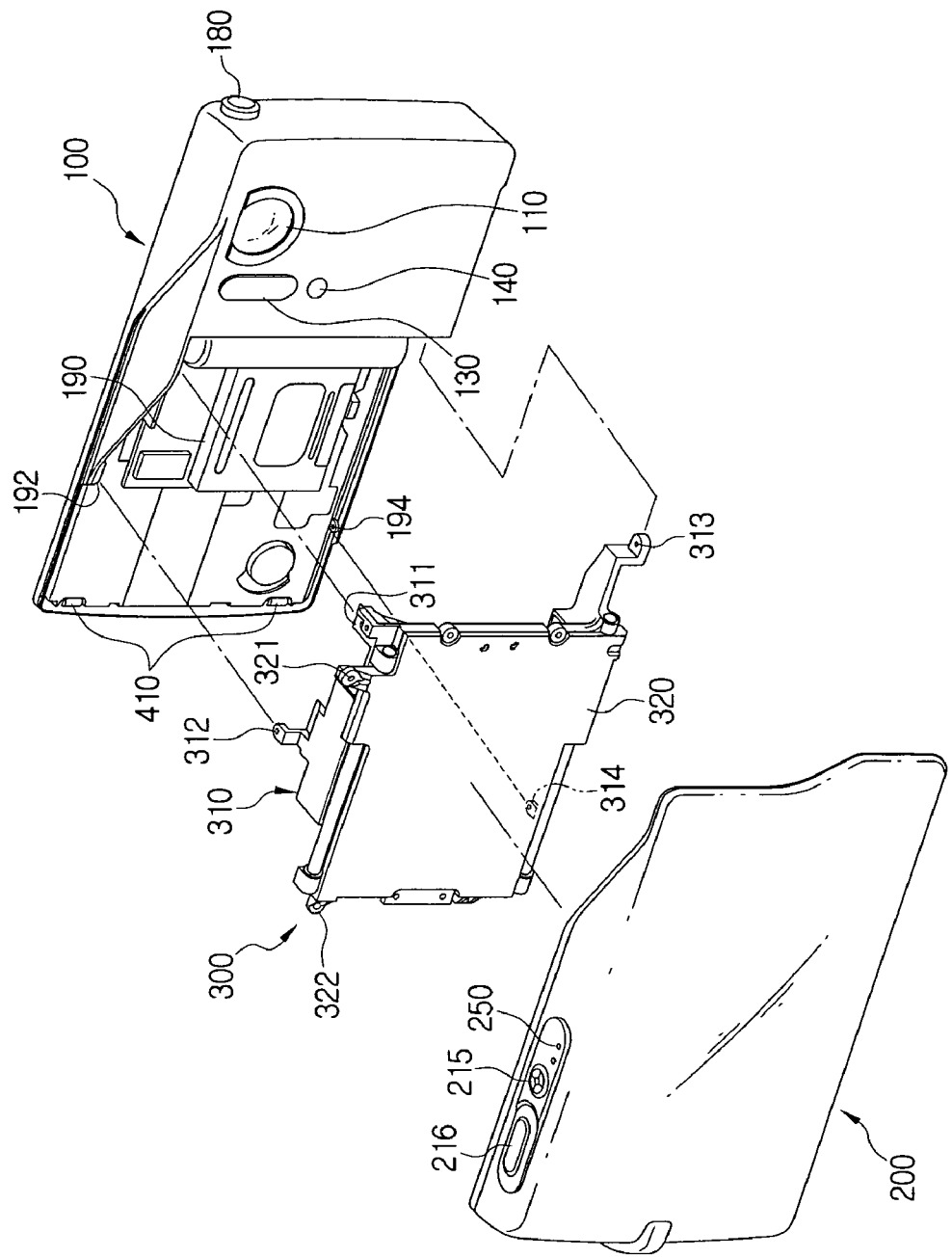
FIG. 1 is an exploded perspective view of the front of a digital device according to an exemplary embodiment of the present invention.
Figure 2:
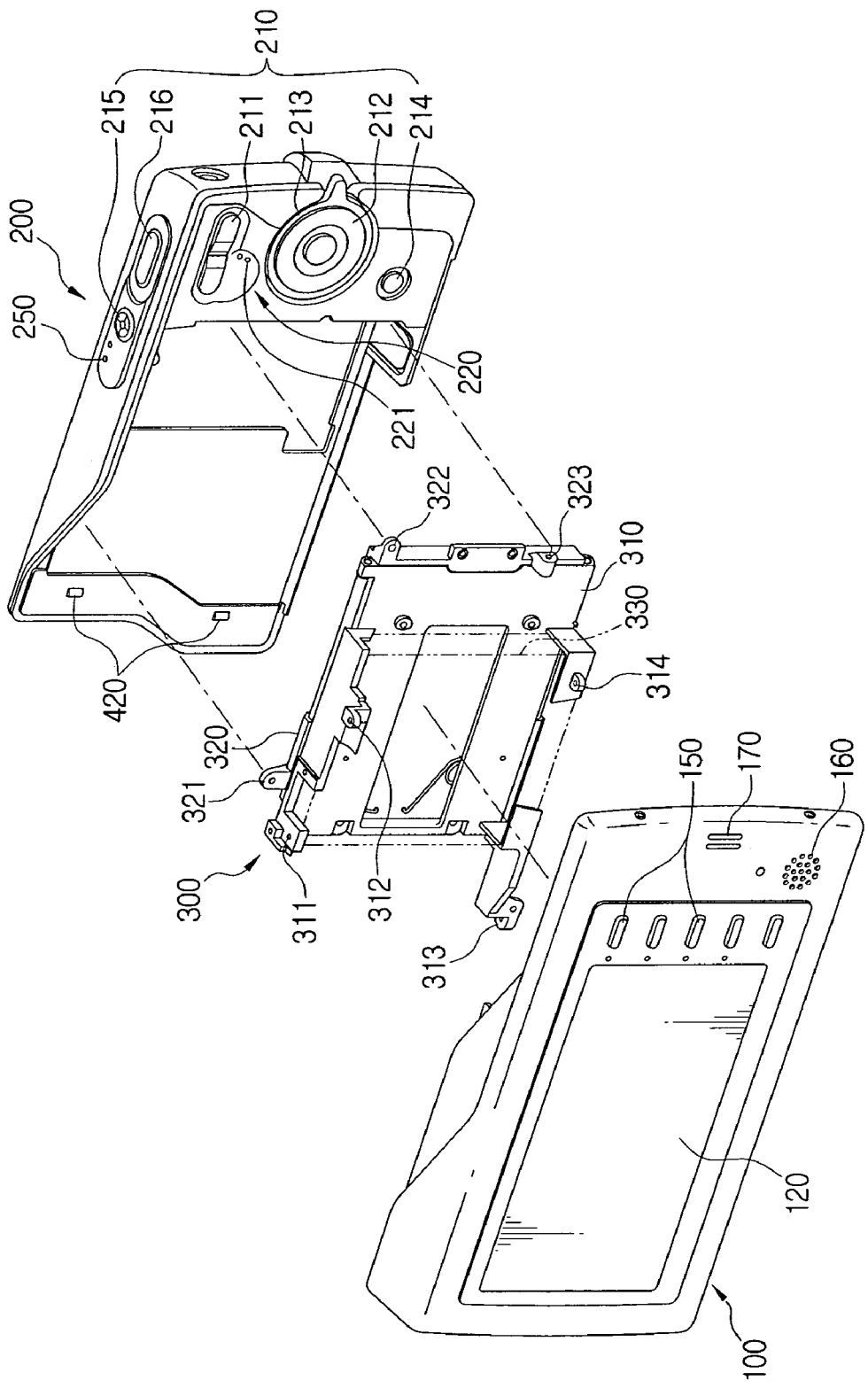
FIG. 2 is an exploded perspective view of the back of the digital device of FIG. 1.

As shown in FIGS. 1 and 2, a digital device in accordance with an exemplary embodiment of the present invention includes a first body 100 and a second body 200. The first body 100 and the second body 200 are slidably attached to each other so that they made slide between a first position and a second position. The first body 100 includes a lens 110 and a display 120, and the second body 200 includes a plurality of operation buttons 210. A digital device according to the exemplary embodiments of the present invention is equipped with various functions such as still image capturing, moving image capturing, voice recording, MP3 playing, DMB receiving, and web camera.

Figure 3:
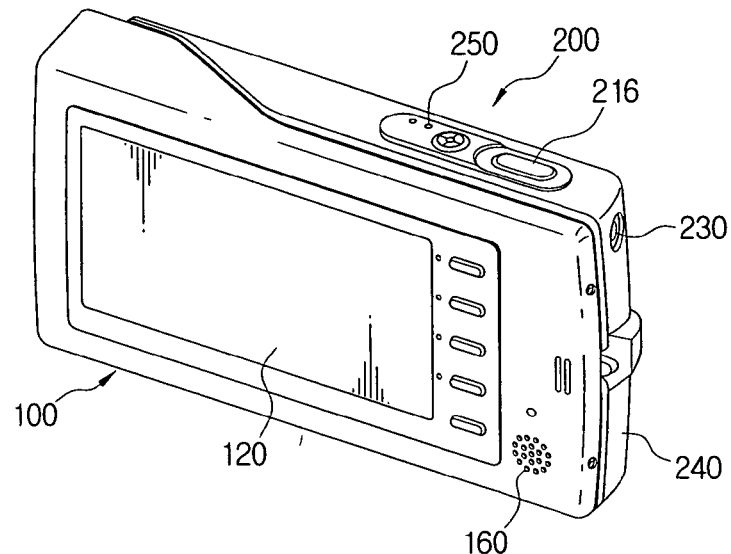
FIG. 3 is perspective view of the front of an assembled digital device according to an exemplary embodiment of the present invention.
Figure 4:
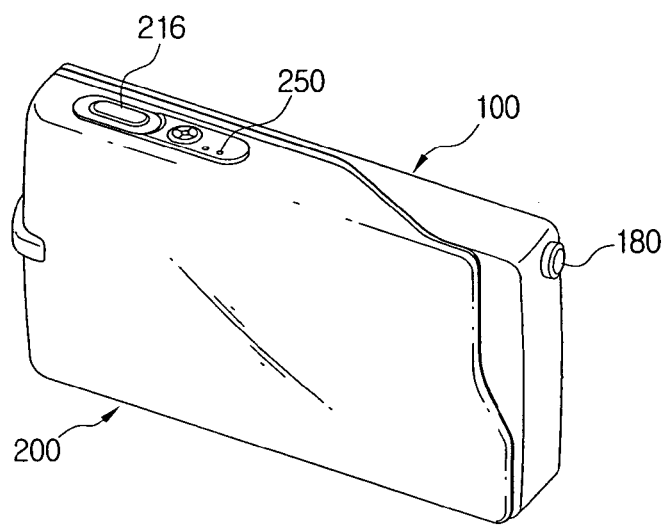
FIG. 4 is perspective view of the back of the assembled digital device of FIG. 3.
Figure 6:
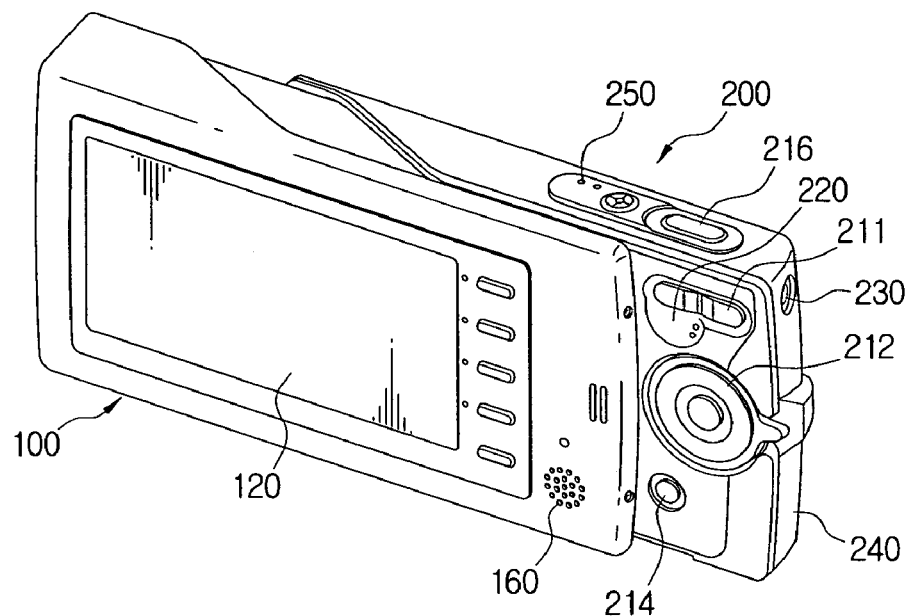
FIG. 6 is a perspective view of the front of the digital device of FIG. 3 in an open position.
Figure 7:
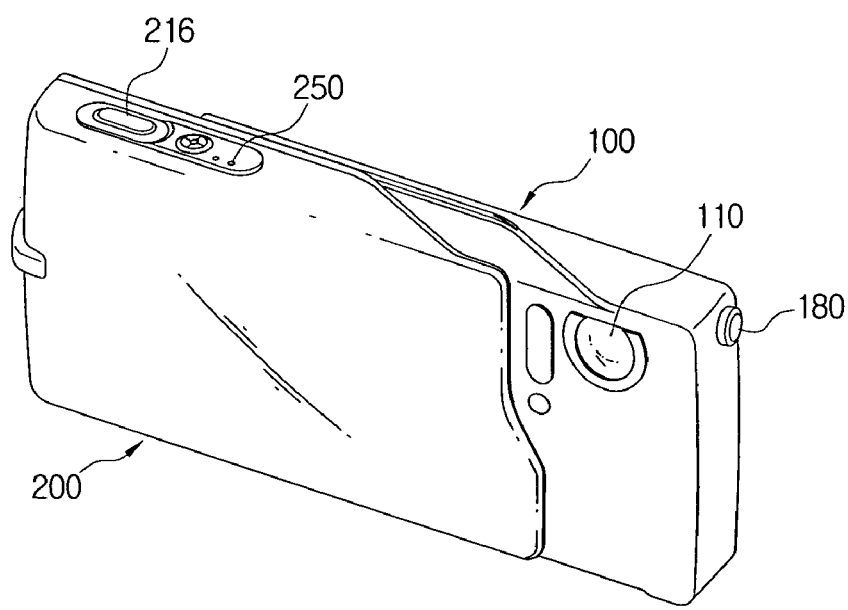
FIG. 7 is a perspective view of the back of the digital device of FIG. 3 in an open position.

Further, the digital device includes a sliding apparatus 300 for slidably moving the second body 200 relative to the first body 100 into the first position and the second position. The first position is a position where the lens 110 of the first body 100 and the operation buttons 210 of the second body 200 are exposed (FIGS. 6 and 7). The second position is a position where the lens 110 of the first body 100 and the operation button 210 of the second body 200 are hidden (FIGS. 3 and 4).

The lens 110 and the operation buttons 210 are exposed by slidably moving the first body 100 and the second body 200 into the first position. In this position, they are operational so that they can capture still and moving images. The lens 110 and the operation buttons 210 are hidden by slidably moving the first body 100 and the second body 200 into the second position. In this position, the lens 110 and the operation button 210 are protected after capturing any desired images. Additional functions may be conveniently used when the first body 100 and the second body 200 are slid into the second position.

As shown in FIG. 3 to FIG. 7, the lens 110 is mounted on a front side of the first body 100, and the display 120 (such as an LCD) is mounted on a rear side of the first body 100. The display 120 can be configured as a large display because the first body 100 does not have many additional components (such as operation buttons). Furthermore, the first body 100 does not have a gripping portion. In other words, in a conventional digital device, the digital device has one body on which the display and the plurality of operation buttons are arranged, and the body serves as a grip for the digital device. Thus, in the conventional device, it is difficult to make the display larger. In contrast, in the digital device according to the exemplary embodiments of the present invention, the operation buttons 210, the gripping portion and the various other components, other than the display 120, are disposed on the second body 200. Thus, a larger display may be used, but the overall size of the digital device is not large.

Further, the first body 100 is provided with a strobe flash 130 and an LED light 140 on the front surface. A plurality of functional keys 150 are provided to operate the device, such as by moving between menus. A speaker 160 is provided on a rear surface of the first body 100. Protrusions 170 are formed on the rear surface of the first body to provide a convenient place for a user to grasp the first body to slide the first body 100 without slipping. Further, an end of an antenna 180 is exposed on a side of the first body 100. Meanwhile, circuitry components 190, including a printed circuit board, are housed within the first body 100.

The second body 200 includes a gripping portion that is exposed when the first body 100 is in the first position. The gripping portion is formed by a gripping groove 220 that receives a thumb of a user. The gripping groove 220 is formed with protrusions 221 to prevent slippage. The plurality of operation buttons 210 operate various functions of the digital device. For example, they operation buttons may include a zoom button 211, a 5-way button 212, a mode switch button 213, a menu selection button 214, a power button 215, a shutter 216 and the like.

In the illustrated exemplary embodiment, the zoom button 211, the 5-way button 212, the mode switch button 213 and the menu selection button 214 are arranged in the gripping portion, and the power button 215 and the shutter 216 are arranged on a top surface of the second body 200. Also, an AV and an earphone jack 230 are arranged on an upper side surface of the second body 200. A power supply (i.e., DC voltage) jack, a USB jack and the like are provided on the bottom surface of the second body 200. A cover 240 may be provided to hide the power supply jack and USB jack when they are not in use.

Further, the mode switch button 213 is ring-shaped so as to be positioned around the 5-way button 212. This type of ring-shaped mode switch button 213 enhances the space efficiency of the second body 200. A microphone 250 is provided on the top surface of the digital device.

Figure 8A:
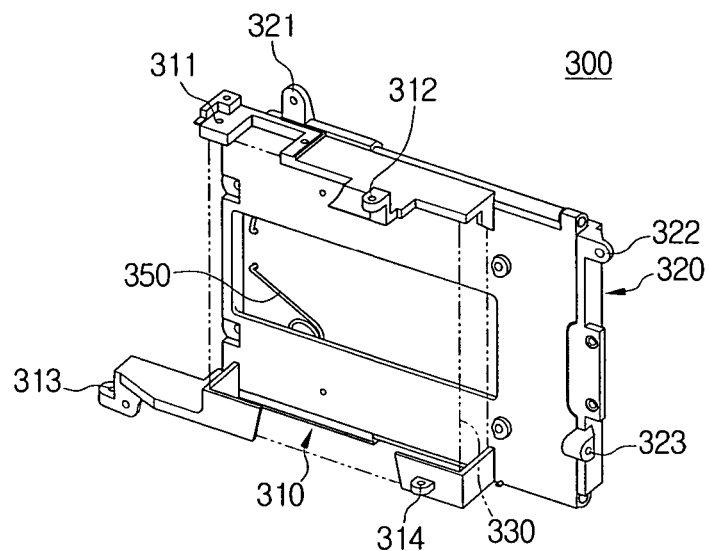
FIGS. 8A, 8B and 8C illustrate a sliding apparatus of the digital device according to an exemplary embodiment of the present invention.
Figure 8B:
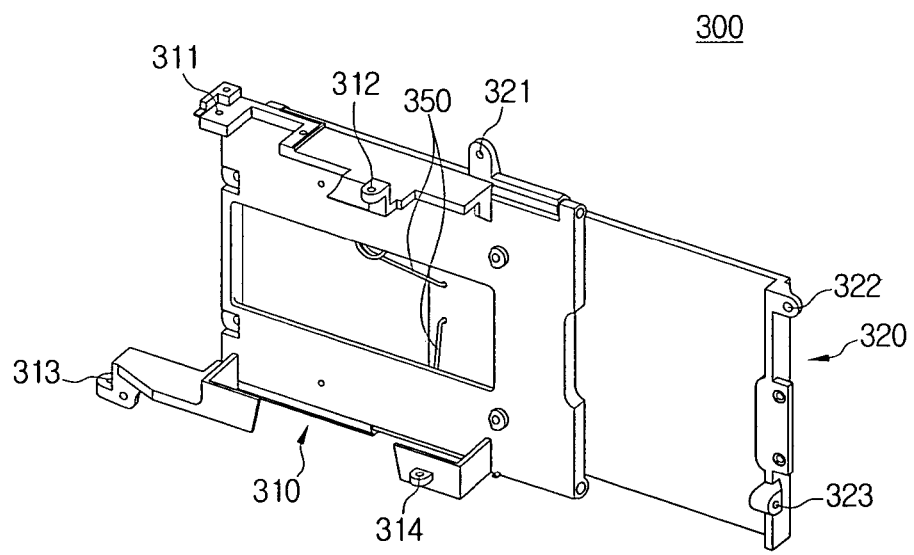
Figure 8C:
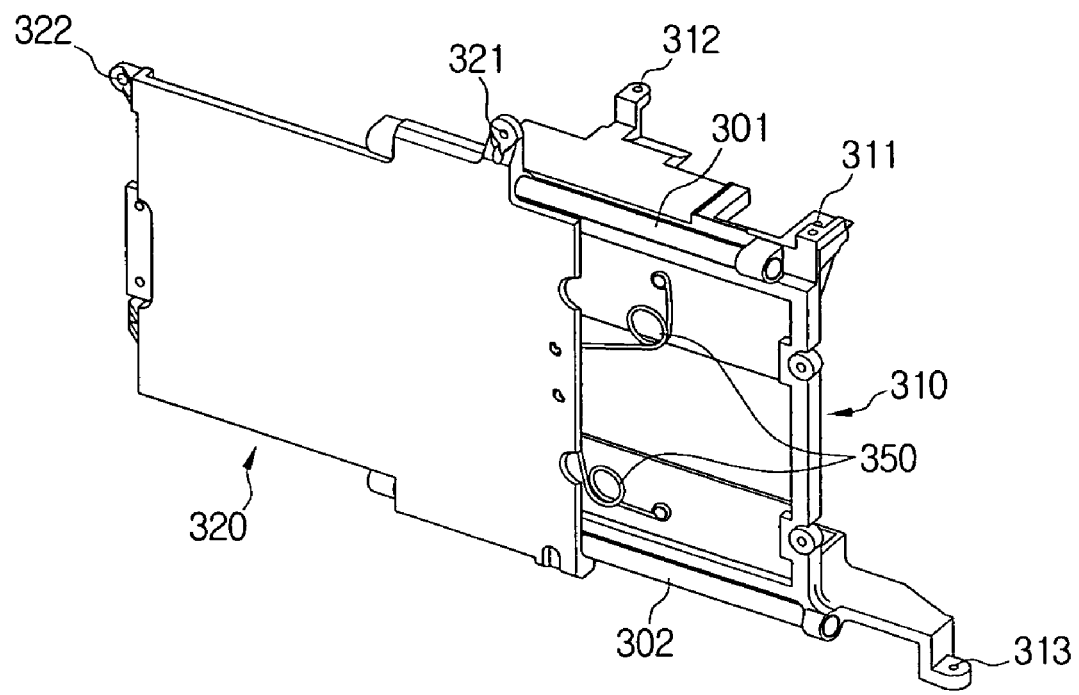

Meanwhile, the sliding apparatus 300 includes a first sliding member 310 combined with the first body 100 and a second sliding member 320 combined with the second body 200, as shown in FIGS. 8a, 8b, and 8c.

The first and second sliding members 310 and 320 are slidably connected with each other by a pair of guide shafts 301 and 302. The first sliding member 310 is provided with a plurality of holding pieces 311, 312, 313, and 314, and the first body 100 is provided with a plurality of holding portions 192 and 194 (some of the holding portions are not shown) corresponding to the plurality of holding pieces 311, 312, 313, and 314. Also, the second sliding member 320 is provided with a plurality of holding pieces 321, 322 and 323, and the first body 200 is provided with a plurality of holding portions (not shown) corresponding to the plurality of holding pieces 321-323. The first body 100, the second body 200 and the sliding apparatus 300 are assembled by holding pieces 311, 312, 313, and 314 and holding portions 192 and 194.

Figure 5:
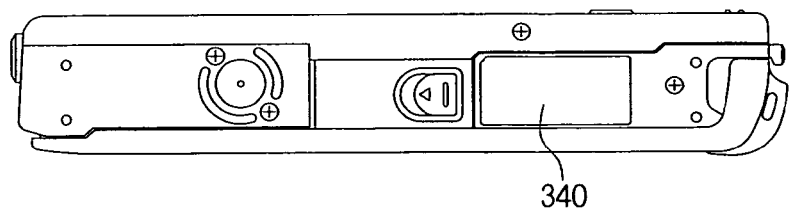
FIG. 5 is a bottom plan view of the digital device of FIG. 3.

Further, a battery mounting space 330 is disposed in the sliding apparatus 300. The battery mounting space 330 is located between the first and the second sliding members 310 and 320. Consequently, a separate space for mounting a battery in the first body 100 and the second body 200 is unnecessary. A cover 340 selectively opens an entrance to the battery mounting space 330, as shown in FIG. 5.

Biasing members 350 may be provided to assist the sliding movement of the first and second sliding members with respect to each other.

Guide rollers 410 and 420 are arranged on a sliding contact surface of the first body 100 and the second body 200 to facilitate the sliding movement and prevent scratching of the contact surface. That is, a pair of first guide rollers 410 are provided in the first body 100 to contact the gripping portion of the second body 200, and a pair of second guide rollers 420 are provided in the second body 200 to contact the lens mounting surface of the first body 100, as shown in FIG. 1 and FIG. 2.

Figure 9A:
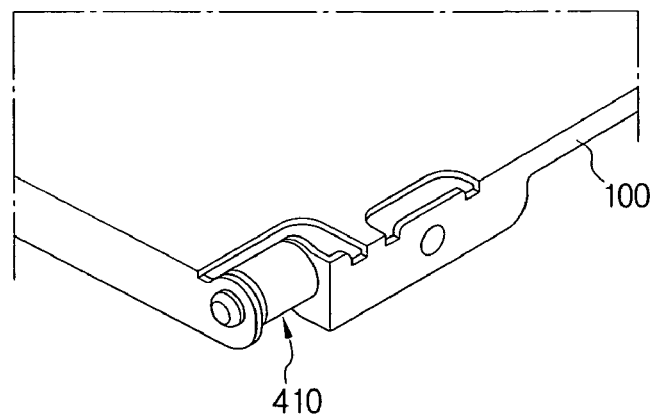
FIGS. 9A and 9B are perspective views illustrating a first guide roller of the digital device according to an exemplary embodiment of the present invention.
Figure 9B:
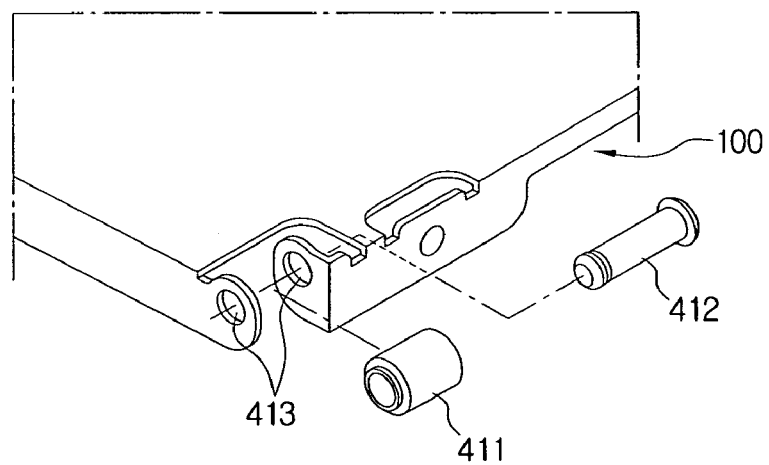

The first guide roller 410 includes a roller portion 411 and a shaft 412, as shown in FIG. 9A and FIG. 9B. Also, the first body 100 is formed with a hole 413 for supporting the shaft 412. The roller portion 411 is inserted onto the shaft 412, and the shaft 412 is fixedly inserted into the hole by any suitable method, such as an E-ring, by spinning or caulking. Each first guide roller 410 has a substantially identical structure and is mounted in a symmetrical position.

Figure 10A:
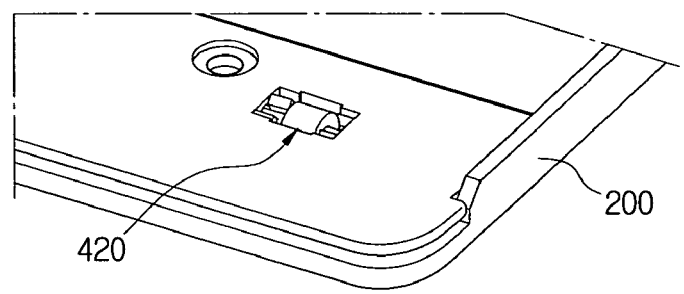
FIGS. 10A and 10B are perspective views illustrating a second guide roller of the digital device according to an exemplary embodiment of the present invention.
Figure 10B:
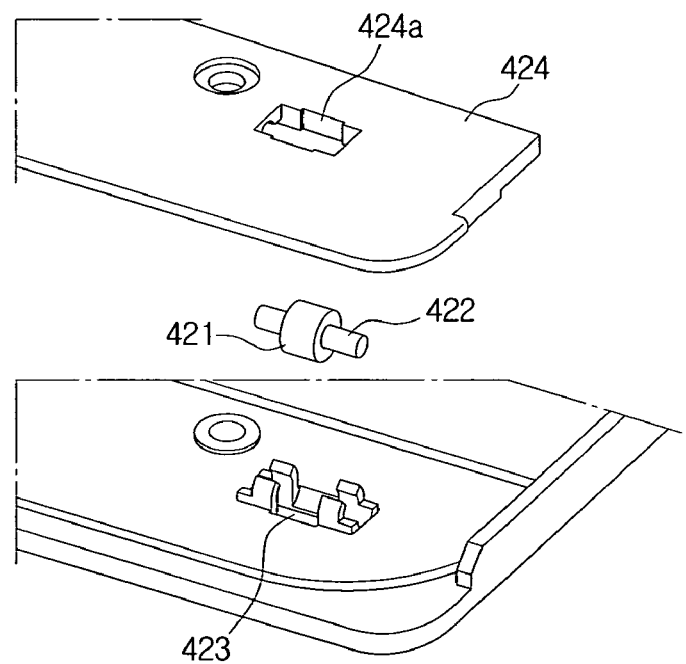

The second guide roller 420 is configured such that a roller portion 421 and a shaft 422 are formed integrally, as shown in FIGS. 10A and 10B. The second body 200 is formed with a roller holding portion 423. The second guide roller 420 is mounted to the second body 200 by rotatably securing the shaft 422 in the roller holding portion 423. A front inner case 424 is provided in the second body 200 in FIG. 10. A groove 424a is prepared in the front inner case 424 to accommodate the guide roller 420. Each second guide roller 420 has a substantially identical structure and is mounted in a symmetrical position.

In the digital device according to an exemplary embodiment of the present invention, the sliding apparatus 300 is assembled into the second body 200 using a fastener such as a screw. At this time, since the clamping operation of the screw is performed inside the second body 200, the screw is not visible outside the second body 200. Therefore, a simple design is possible.

After assembling the second body 200 and the sliding apparatus 300 as described above, the first body 100 is assembled with the lens and the display, and then assembled with the sliding apparatus 300 to complete the product.

FIG. 3 and FIG. 4 are perspective views of the digital device in the second (i.e. closed) position according to an exemplary embodiment of the present invention, and FIG. 6 and FIG. 7 illustrate the digital device in an open (i.e., first) position. To capture a still or moving image, if the user softly pushes the pushing portion of the first body 100 leftward with respect to the drawing, the first body 100 and the second body 200 are slid into the first position due to the action of the sliding apparatus 300, as shown in FIG. 6.

Subsequently, as the gripping portion which was hidden by the first body 100 and various operation buttons 210 configured on the gripping portion are exposed, as well as the lens 110 which was hidden by the second body 200 is exposed, an image is ready to be captured. The user can take the image while operating various operation buttons configured on the gripping portion while the user securely grips the camera via the gripping portion.

Meanwhile, the digital device may be configured such that the image capturing mode is automatically selected when the first body 100 and the second body 200 are slid into the first position. Of course, other functions can be also performed by changing the image capturing mode into other modes.

After capturing any desired images, the first body 100 and the second body 200 may be slid into the second position. In this position, the digital device is relatively small and the lens 110 of the first body 100 and the operation button 210 of the second body 200 are hidden (as shown in FIG. 3), Therefore, the digital device is easy to carry. A separate gripping portion is not necessary for the functions other than the image capturing mode, for example, DMB receiving function, the user can view broadcasting while conveniently gripping the device.

According to the present invention as described above, since the operation buttons 210 and the gripping portion are configured on the second body 200 without the display 120, it is possible to make the display 120 of the first body 100 larger despite its small overall size. Further, it is possible to provide a stable gripping portion while employing the large display, and therefore to produce the digital device which is easy to use, for example, a multi-function multiplex digital camera.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A digital device comprising:
a first body with a lens and a display;
a second body with at least one operation button, the second body sliding between a first position and a second position;
a sliding apparatus slidably connecting the first and second bodies so that the second body can slide between the first and second positions; and a battery space accommodating a battery in the sliding apparatus;

wherein the lens of the first body and the at least one operation button of the second body are exposed together as the first body and the second body are slid into the first position so that a still image or a moving image can be photographed.

2. The digital device according to claim 1, wherein the lens of the first body and the at least one operation button of the second body are hidden as the first body and the second body are slid into a second position.

3. The digital device according to claim 1, wherein an image capturing mode is selected when the first body and the second body are slid into the first position.

4. The digital device according to claim 1, further comprising at least one function button disposed on a display mounting portion of the first body.

5. The digital device according to claim 1, further comprising a speaker disposed on a display mounting portion of the first body.

6. The digital device according to claim 1, further comprising a pushing portion disposed on the first body, the pushing portion comprising at least one protrusion for preventing slippage.

7. The digital device according to claim 1, further comprising a gripping portion disposed on the second body, the gripping portion comprising at least one gripping groove.

8. The digital device according to claim 7, wherein the gripping groove comprises a protrusion for preventing slippage.

9. The digital device according to claim 1, wherein the second body comprises a plurality of operation buttons.

10. The digital device according to claim 9, wherein the plurality of operation buttons comprises a zoom button, a 5-way button for operating a menu, a mode switch button, and a menu selection button.

11. The digital device according to claim 10, wherein the mode switch button is ring-shaped and arranged around the 5-way button.

12. The digital device according to claim 10, wherein the second body comprises a microphone, a power button, and a shutter disposed on a top surface of the second body, an A/V and an earphone jack disposed on an upper side surface of the second body, and a power supply jack and a USB jack disposed on a lower side surface of the second body.

13. A digital device comprising:
a first body with a lens and a display;
a second body with at least one operation button;
a sliding apparatus slidably connecting the first and second bodies so that the first and second bodies can slide between first and second positions; and
a battery space accommodating a battery in the sliding apparatus
wherein the lens of the first body and at least one operation button of the second body are exposed together as the first body and the second body are sliding with respect to each other so that a still image and a moving image can be photographed.

14. The digital device according to claim 13, further comprising a guide roller for facilitating sliding.

15. The digital device according to claim 13, wherein the sliding apparatus comprises a first sliding member combined with the first body and a second sliding member combined with the second body.

16. The digital device according to claim 13, wherein an image capturing mode is selected when the first body and the second body are slid with respect to each other.

17. The digital device according to claim 13, further comprising a pushing portion disposed on the first body, the pushing portion comprising at least one protrusion for preventing slippage.

18. The digital device according to claim 13, further comprising a gripping portion disposed on the second body, the gripping portion comprising at least one gripping groove.

19. The digital device according to claim 13, wherein the second body comprises a plurality of operation buttons.

20. The digital device according to claim 19, wherein the plurality of operation buttons comprises a zoom button, a 5-way button for operating a menu, a mode switch button, and a menu selection button.

21. The digital device according to claim 20, wherein the mode switch button is ring-shaped and arranged around the 5-way button.

22. The digital device according to claim 20, wherein the second body comprises a microphone, a power button, and a shutter disposed on a top surface of the second body, an A/V and an earphone jack disposed on an upper side surface of the second body, and a power supply jack and a USB jack disposed on a lower side surface of the second body.

23. A digital device comprising:
a first body having a lens and a display;
a second body having at least one operation button, the second body being slidably connected to the first body so that it can slide between a first and a second position;
a sliding apparatus slidably connecting the first and second bodies so that the first and second bodies can slide between the first and second positions; and
a battery space accommodating a battery in the sliding apparatus;
wherein in the first position the lens and the at least one operation button are exposed, and in the second position the lens and the at least one operation button are hidden.

24. The digital device according to claim 23, wherein the sliding apparatus comprises:
a first sliding member disposed on the first body; and
a second sliding member disposed on the second body, the second sliding member sliding with respect to the first sliding member.

25. The digital device according to claim 24, further comprising a plurality of guide rollers disposed on the first and second sliding members for facilitating the sliding movement of the first and second bodies.

26. The digital device according to claim 24, further comprising at least one biasing member disposed between the first and second sliding members to facilitate sliding of the first and second sliding members.

27. The digital device according to claim 24, wherein the battery space is disposed between the first and second sliding members.

28. The digital device according to claim 23, wherein a cover is formed at the entrance of the battery space to open or close the battery space and the cover is opened or closed when the first and second bodies are slinging into the first position.

* * * * *